(No Model.)
J. S. HULETT.
ROAD CART.
No. 378,888. Patented Mar. 6, 1888.
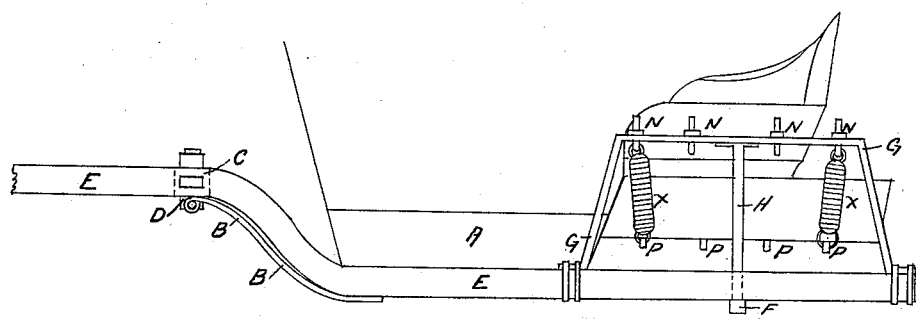
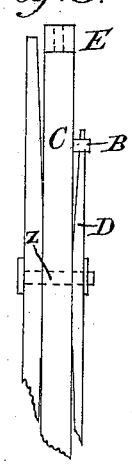
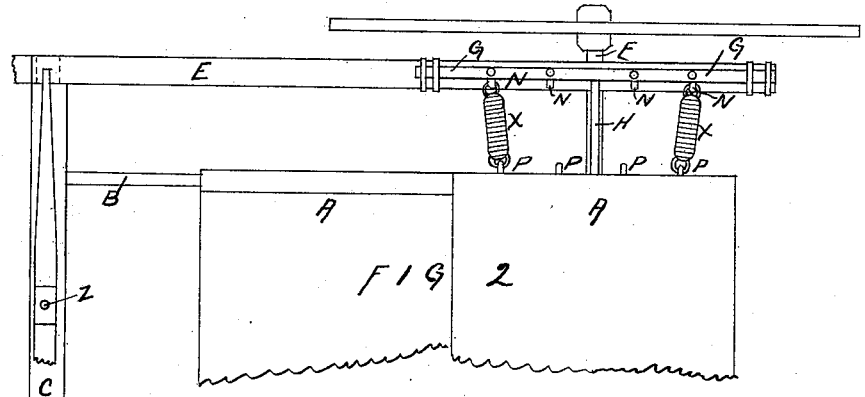
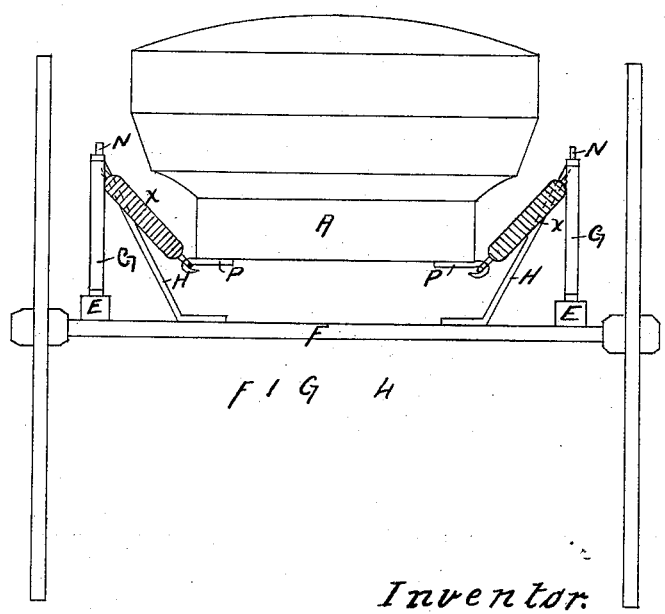
Witnesses
C. E. Hiller
E. O. Miller
Inventor:
John Squires Hulett
per
Frederick Fraser Miller
Attorney.

UNITED STATES PATENT OFFICE.

JOHN SQUIRES HULETT, OF NAPANEE, ONTARIO, CANADA.

ROAD-CART.

SPECIFICATION forming part of Letters Patent No. 378,888, dated March 6, 1888.

Application filed June 16, 1887. Serial No. 241,569. (No model.)

*To all whom it may concern:*

Be it known that I, JOHN SQUIRES HULETT, a citizen of the Dominion of Canada, residing at the town of Napanee, in the county of Lennox and Addington and Province of Ontario, have invented new and useful Improvements in Carts, of which the following is a specification.

My invention relates to improvements in carts in which coil-springs operate in conjunction with a bar suspended by the center to the center of the cross-bar of the shafts, and said bar being connected by two spring-bars to the box of the cart; and the objects of my improvements are, first, to provide an adjustable spring to afford facilities for the proper adjustment of the springs to the load to be placed in the cart; second, to take the horse motion off the cart and the cart motion off the horse. I attain these objects by the mechanism illustrated in the accompanying drawings, in which—

Figure 1 is a side elevation of a cart with wheels removed. Fig. 2 is a plan of half a cart with seat and box removed to show the bottom of the box. Fig. 3 is an end elevation of half of the cross-bar of shafts, showing the bar suspended under it to which the box is connected. Fig. 4 is an elevation of the rear end of a cart.

Similar letters refer to similar parts throughout the several views.

The box A of the cart is suspended at the front by two spring-bars, B, which are otherwise fastened to the rod D, which is suspended by the center to the center of the cross-bar C of the shafts E by means of the bolt Z. This allows the box to have a small horizontal motion about Z as a center and a vertical motion about C as a center. The shafts E extend back past and are fastened to the axle F. Frames G G, of wood or iron, are fastened above each of the shafts, in the manner shown in the drawings, and are braced to the axle F by the braces H. Hooks N N are fastened to the upper part of G by nuts with thread turned on them, so that they can be raised and lowered. Four coil-springs, X X X X—two on each side of the cart—are hooked on the hooks N N, and the lower ends of X X are hooked in hooks P P, fastened to the box A of the cart. By raising and lowering the hooks N N, and by shifting the springs to different hooks along the frame G G and box A, and by removing or replacing any of them, the tension of the springs may be adjusted to suit the load to be placed in the cart. The springs, being hung in this position, allow the box A to have a horizontal motion to meet the motion of the horse or the motion derived from one wheel striking a stone or other object in the road.

I am aware that prior to my invention coil-springs have been used on carts. I therefore do not claim such an adoption, broadly; but,

What I claim as my invention, and desire to secure by Letters Patent, is—

The combination of the coil-springs X and the bars B and D and the frame G, all substantially as set forth.

JOHN SQUIRES HULETT.

Witnesses:
CHARLES FINDLAY HENDERSON,
WILLIAM LESTER LATIMER.